Dec. 29, 1959   R. C. MIERENDORF ET AL   2,919,385
TIMING CIRCUITS
Filed July 9, 1956

INVENTORS.
ROBERT C. MIERENDORF
CLARENCE W. PORTER
BY
Myron J. Seibold
Atty.

United States Patent Office 2,919,385
Patented Dec. 29, 1959

2,919,385

TIMING CIRCUITS

Robert C. Mierendorf and Clarence W. Porter, Wauwatosa, Wis., assignors to Square D Company, Detroit, Mich., a corporation of Michigan Application July 9, 1956, Serial No. 596,635

11 Claims. (Cl. 317—142)

The present invention relates to timing circuits, and more particularly to timing circuits having an adjustable time interval and an output which is reversible in polarity.

In the prior art, circuits have been provided for controlling a time interval for one mode of operation only and were unreliable in time duration due to the component arrangement. Generally, the present invention is directed to timing circuits each of which provides several modes of operation or control of the output circuit, constant timing period, and fail safe operation for components more apt to malfunction.

The circuits of the present invention include a timing network and output or control circuit connected in parallel across an A.C. power source. The time period of conduction or non-conduction of the grid controlled gaseous tube in the output circuit is controlled by the time period of the output signal of the timing network which is coupled to the grid of the gas tube. The operation of the gas tube conducting or non-conducting over the timing period, in turn, controls an A.C. relay in the plate circuit.

The timing network includes storage capacitor having a variable impedance discharge path or R.C. circuit to control the time interval and is energized by D.C. sources of both polarities through a reversing switch for connecting a voltage of either polarity to the grid coupled side of the storage capacitor thereby reversing the polarity of the timing output signal. The timing period is started by interrupting the charging path of the storage capacitor discharging the capacitor through the impedance to decrease the capacitor voltage and signal to the grid which crosses over zero at the end of the timing period to initiate conduction or cutoff of the gas tube.

It is an object, therefore, of the present invention to provide a timing circuit having the foregoing advantages of accuracy, simplicity and economy and eliminating the disadvantages found in the prior art.

Another object of the invention is the provision of a component arrangement capable of providing several timing output signals.

A further object is to provide a timing network for producing timing signals to control an output circuit for different modes of operation.

Still another object is to provide a circuit for producing timing signals having a continuously variable time duration and diversified outputs for controlling a gaseous discharge device or other output circuits.

Further objects and features of the invention will be readily apparent to those skilled in the art from the specification and appended drawing illustrating certain preferred embodiments in which:

Figs. 2-4 are graphical representations of the output signals for several modes of operation of the timing circuit of Fig. 1.

Figure 1:
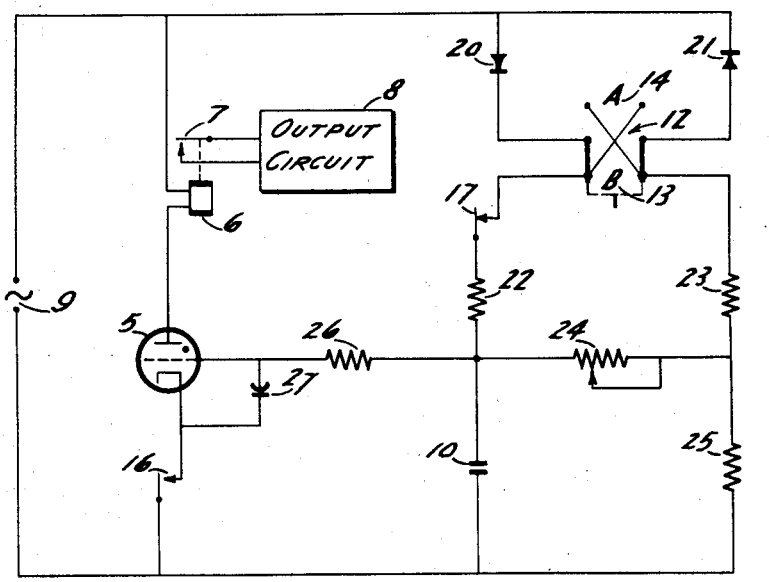
Fig. 1 is a circuit diagram of the timing circuit in which the output circuit is shown in block diagram.

Referring now to the drawings, there is shown in Fig. 1, which illustrates a preferred embodiment, a timing circuit connected to an A.C. supply source 9 and having output circuit 8. The output circuit 8 may include other timing circuits to provide additional timing periods or direct control of the apparatus to be timed. The output circuit as shown is controlled by an A.C. relay 6, having operating contacts 7, connected in series with the gaseous discharge device 5 whose period of operation, either conducting or non-conducting, is controlled by a timing signal network connected to its grid. Initiating means are connected in the cathode circuit of the gaseous discharge device and are shown as contacts 16 which may include any switching apparatus for completing the cathode circuit.

The storage capacitor 10 is connected in one leg of the bridge circuit of the timing network and to the supply source 9 through rectifier 20, providing a source of positive D.C. voltage, and rectifier 21 for a negative D.C. voltage. A cross-over discharging switching means is shown as a switch 12 providing either a positive or negative voltage on the side of the capacitor connected to the grid, having switch arms which, as shown in the drawings, are connected to contacts 13 for charging the capacitor 10 and providing a positive bias on the grid.

Timing switching contacts 17 are connected in a series circuit with the one leg of the bridge for interrupting the charging of the capacitor 10 from the respective rectifier source of D.C. voltage initiating the timing interval or discharge of the capacitor 10 through the variable impedance or resistor 24 connected across the bridge to a point between the resistors 23 and 25. The voltage division ratio of the resistors 23 and 25, forming two legs of the bridge circuit, controls the negative holdoff bias voltage when the switch arms are connected to the terminals 13, position B, and the positive D.C. bias voltage level when the rectifiers or D.C. supply are connected to terminals 14 or position A of the switch 12. Resistor 22 in series with the contacts 17 and one leg of the bridge is provided for limiting the charging current to capacitor 10 through the rectifiers 20 or 21. Resistor 26 in series circuit with the grid input, in combination with capacitor 27 coupling the grid to the cathode, provide a grid filter for the tube 5.

Figure 2:
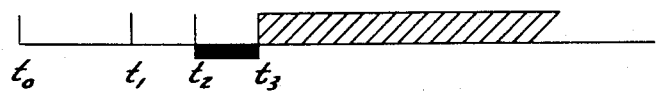
Figure 3:
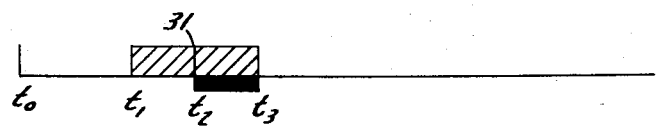
Figure 3:
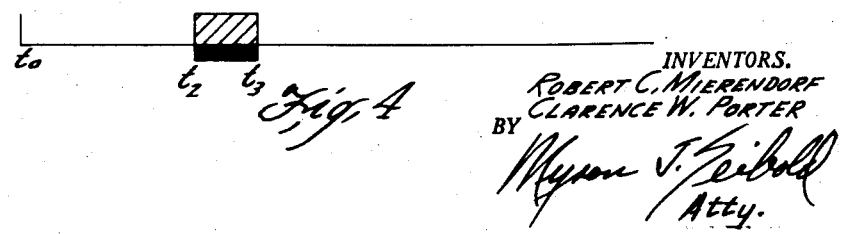

In operation, several modes of timing are provided by the position of the mode switch 12 by connecting the D.C. sources of opposite polarity to the timing bridge circuit and by controlling the operation of initiating contacts 16 and timing contacts 17. The different modes of timing operation are shown in Figs. 2–4 in which the timing interval shown in Fig. 2 is provided by connecting the switch arms to terminals 14 in position A thereby connecting the negative source of D.C. voltage or rectifier 21 to the capacitor 10 thru the timing contacts 17 and resistor 22. The other terminal 14 connects the positive D.C. voltage to the other side of the timing bridge circuit to provide a D.C. bias voltage level at the voltage divider tap between resistors 23 and 25.

If the mode switch 12 is positioned for connecting terminals 14 to the rectifiers 20 and 21 during the interval $t0$—$t1$, initiating switch contacts 16 are closed at time $t1$ and timing switch contacts 17 are opened at time $t2$, the tube 5 will remain non-conductive over the timing period $t2$—$t3$, or the discharge time of capacitor 10 through resistor 25 and a portion of resistor 24 included in the R.C. circuit wherein adjustment of the voltage at the junction of terminals 23 and 25 as well as the R.C. components will alter the timing period. In the circuit illustrated, tube 5 will conduct as the storage capacitor charge or timing signal voltage passes through zero at time $t3$; however, the voltage of the storage capacitor grid will rise to the positive D.C. bias voltage level at the junction of resistors 23 and 25 if timing contacts 17 remain open over the R.C. time period.

Conduction during the timing interval t2—t3, shown graphically in Fig. 3, is provided by connecting the contact arms of the mode switch 12 to the terminals 13 or position B as shown in the drawings, whereby the positive source of D.C. voltage or rectifier 20 is connected to the timing switch 17 upon closing the circuit to the storage capacitor 10 through the resistor 22. The negative source of D.C. voltage or rectifier 21 is connected to the voltage divider to provide a negative D.C. holdoff bias voltage at the junction of resistors 23 and 25.

The circuit operation is otherwise substantially the same as described in connection with the diagram of Fig. 2 wherein the mode switch 12 and timing contacts 17 are closed before or at the time t1. Initiating switch contacts 16 are closed at time t1 to complete the cathode circuit of tube 5 and timing contacts 17 are opened at time t2 to start the discharge of capacitor 10 through resistor 24 and begin the timed period. The timed period of conduction of tube 5 is shown between t2 and t3; however, as shown by the area 31 in Fig. 3, conduction begins at time t1 upon completion of the cathode circuit of the tube 5 through initiating contacts 16.

The mode of operation illustrated in the diagram of Fig. 4 is provided by opening timing contacts 17 at the same instant initiating contacts 16 are closed. Before the time t2 the mode switch 12 and the timing contacts 17 are closed, connecting the positive D.C. voltage to the capacitor 10 through the resistor 22. The initiating contacts 16, however, are not closed until the time t2 at which instant timing contacts 17 are simultaneously opened to begin the timed period at the same instant tube 5 conducts.

If the voltage across the capacitor is considered as the timing wave during the timing interval, tube 5 will be conductive during the positive swing of the timing wave and until it passes through zero at the end of the capacitor discharge time. Conduction of tube 5 energizes relay 6 to operate or close contacts 7, as shown, and control the output circuit 8. The output circuit and relay 6 as well as the grid controlled gaseous discharge device, are illustrative of embodiments of indicator or output control circuits and it is readily apparent that any number of circuits or components may be controlled by the timing circuit network output.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

We claim:
1. A circuit of the type described comprising; a capacitor storage means, a bridge circuit for selectively and simultaneously reversibly connecting sources of D.C. voltages of opposite polarity across said storage means and said bridge circuit, said bridge circuit including a variable impedance connected across said capacitor and between the sources to control the discharge rate of said capacitor, circuit means for disconnecting one of said voltage sources from said bridge circuit to discharge said storage means through said impedance and permit the capacitor to be charged through the impedance to the polarity of the other sources, and output circuit means connected to said storage means responsive to the discharge of said storage means.

2. A circuit of the type described comprising; capacitor storage means, reversible switching means for selectively and simultaneously connecting D.C. voltage sources of opposite polarity across said capacitor and for charging the capacitor with a polarity of one of the sources, a variable resistor connected across said capacitor and sources, an output circuit having circuit means for supplying power to said circuit including a gaseous discharge device having a grid connected to one side of said capacitor whereby said discharge device is responsive to the polarity of the capacitor and to a positive voltage coupled to said grid from said capacitor to be conductive and a negative voltage to be non-conductive, circuit means for disconnecting the said one voltage source from the one side of capacitor coupled to said grid to discharge said capacitor through said variable resistance and charge the capacitor to the polarity of the other D.C. source and change the operation of said discharge device.

3. A timing circuit comprising, a storage capacitor, circuit means for selectively connecting D.C. voltage sources of opposite polarity to opposing ends of said capacitor respectively and reversing said polarity, a variable discharge resistor connecting said sources and connected across opposing ends of said capacitor and variable to change the rate of capacitor discharge, switching means between one of said sources and capacitor for disconnecting said latter source for initiating a timing period extending over the time interval of discharge of said capacitor through said resistor, an output circuit means coupled to said capacitor and to a source of A.C. current and responsive to the discharge of said capacitor to change its mode of operation and a means in said output circuit for interrupting the circuit between said means and A.C. source.

4. A timing circuit comprising, a capacitor, circuit means for selectively and simultaneously connecting D.C. voltage sources of opposite polarity to opposing ends of said capacitor respectively said circuit means being arranged to permit the capacitor to be charged with a polarity of one of the sources, an impedance connecting said sources and connected across opposing ends of said capacitor, switching means between the said one source and capacitor for disconnecting the capacitor from said one source to start a timing period extending over the time interval of discharge of said capacitor through said impedance and an output circuit including a gaseous tube coupled to said capacitor to be responsive to the charge of said capacitor.

5. A circuit for controlling the time period of a grid controlled gaseous discharge device having an output control circuit comprising; a timing network including a capacitor and an impedance connected in a circuit, unidirection conducting devices, circuit means for connecting said unidirectional devices to an A.C. source in inverse parallel, switching means for selectively connecting either of said unidirectional devices to respective sides of said capacitor simultaneously for charging the capacitor with a polarity of either of the sources, a voltage divider connected in series between the switching means and in parallel with said capacitor and having a voltage tap connected to said impedance, a time period initiating switching means connected between the capacitor and switching means, circuit means including a switch for connecting said discharge device to said A.C. source; a grid circuit connecting said discharge device to the capacitor, said discharge device being responsive to the discharge of said capacitor to change its mode of operation.

6. In a timing circuit, the combination comprising; a storage capacitor, circuit means for selectively and simultaneously coupling D.C. voltage sources of opposite polarity to the capacitor, said circuit means including a bridge circuit having the capacitor in one leg thereof, switch means in another leg thereof and a variable impedance in the diagonal thereof and connected to a junction between the legs, said variable impedance being arranged to couple the sources of opposite polarity to each other and to provide a discharge path for the capacitor when the switch means is moved to an open circuit position.

7. In a timing circuit, the combination comprising; a pair of D.C. voltage sources of opposite polarity, a storage capacitor, circuit means for simultaneously connecting both D.C. sources across the capacitor in opposition to each other and for selectively charging the capacitor according to the polarity of one of the sources, a variable impedance means connected across the capacitor and across the sources, and means for disconnecting the one source from the capacitor and the impedance means so the capacitor may be discharged through the impedance means and be charged with the polarity of the other of the sources.

8. In a timing circuit, the combination comprising; a pair of D.C. voltage sources of opposite polarity, a storage capacitor, circuit means for simultaneously connecting both D.C. sources across the capacitor in opposition to each other and for selectively charging the capacitor according to the polarity of one of the sources, a variable impedance means connected across the capacitor and across the sources, means for disconnecting the one source from the capacitor and the impedance means so the capacitor may be discharged through the impedance means and be charged with the polarity of the other of the sources, and output circuit means connected to be responsive to the polarity of the charge on the capacitor.

9. In a timing circuit, the combination comprising; a storage capacitor, a switch and a charging resistance in series circuit with the capacitor, a pair of resistances connected in series circuit, a variable resistance connected to a junction between the resistance and capacitor in the first mentioned series circuit and to a junction between the resistances in the second mentioned series circuit, said variable resistance being arranged to provide a discharge path for the capacitor, a pair of sources of D.C. voltage of opposite polarities, and means for selectively connecting either of the sources across the first series circuit while simultaneously connecting the opposite D.C. voltage source across the second series circuit whereby the switch when closed will cause the capacitor to be charged with a polarity of the voltage across the first circuit and when opened will cause the capacitor to discharge through the variable resistance to a polarity of the D.C. voltage across the second series circuit.

10. The combination as recited in claim 9 wherein an electronic switch has a pair of principal electrodes connected in an output circuit and has a control electrode connected to be responsive to the charge on the capacitor.

11. In combination with an output circuit, a timing circuit for controlling the period of operation of the output circuit comprising, a relay having a pair of contacts in said output circuit and a control winding for controlling the opening and closing of the contacts, a gaseous discharge device having a pair of principal electrodes in a series circuit with the control winding, a source of alternating current connected in said series circuit, a switch in the series circuit for opening and closing the series circuit, said gaseous discharge device also having a control electrode for controlling the conductivity of the gaseous discharge device, an R.C. timing network including a storage capacitor connected between the control electrode and one of the principal electrodes for controlling the conduction of the discharge device in response to the polarity of a charge on the capacitor and a variable resistor connected across the capacitor, circuit means connecting the timing network in parallel with the series circuit across said A.C. source, said circuit means including; a pair of rectifiers connected in inverse parallel to said A.C. source for supplying D.C. source voltages of opposite polarity, reversible switching means for selectively and simultaneously supplying D.C. voltages of opposite polarity across the capacitor and the variable resistance and switch means in circuit with the capacitor and reversing switching means for disconnecting the capacitor from one of said D.C. sources to cause the capacitor to discharge through the resistor during a time interval determined by the setting of the resistor to a polarity of the opposite D.C. source.

References Cited in the file of this patent

UNITED STATES PATENTS

| | | |
|---|---|---|
| 2,579,163 | Wald et al. | Dec. 18, 1951 |
| 2,607,907 | Marshall | Aug. 19, 1952 |